United States Patent
Robinson et al.

[11] Patent Number: 5,159,344
[45] Date of Patent: Oct. 27, 1992

[54] AIRCRAFT THEFT DETECTION AND LOCATION SYSTEM

[75] Inventors: Kenneth A. Robinson, Magnolia; Arthur Zolot, Marblehead, both of Mass.

[73] Assignee: North Atlantic Air, Inc., Danvers, Mass.

[21] Appl. No.: 673,325

[22] Filed: Mar. 22, 1991

[51] Int. Cl.⁵ .............................................. G01S 13/80
[52] U.S. Cl. .................................. 342/44; 340/945; 340/426; 342/42
[58] Field of Search ...................... 342/44, 42, 27, 28, 342/56; 340/825.49, 529, 572, 566, 429, 457, 425.5, 426, 447, 825.36, 825.44, 945, 825.32, 825.31

[56] References Cited
U.S. PATENT DOCUMENTS

| | | | |
|---|---|---|---|
| 3,618,059 | 11/1971 | Allen | 342/465 X |
| 3,713,148 | 1/1973 | Cardullo et al. | 342/42 |
| 3,714,650 | 1/1973 | Fuller et al. | 342/42 |
| 3,824,469 | 7/1974 | Ristenbatt | 325/39 |
| 3,964,024 | 6/1976 | Hutton et al. | 340/152 T |
| 4,015,259 | 3/1977 | Siverhus et al. | 342/44 |
| 4,075,631 | 2/1978 | Dumez | 342/45 |
| 4,104,630 | 8/1978 | Chasek | 342/44 |
| 4,177,466 | 12/1979 | Reagan | 342/456 |
| 4,466,125 | 8/1984 | Kanayama | 455/56 |
| 4,596,988 | 6/1986 | Wanka | 342/457 |
| 4,630,044 | 12/1986 | Polzer | 340/825.72 |
| 4,651,157 | 3/1987 | Gray et al. | 342/457 |
| 4,706,091 | 11/1987 | Scott | 342/42 |
| 4,740,792 | 4/1988 | Sagey et al. | 342/457 |
| 4,742,357 | 5/1988 | Rackley | 342/457 |
| 4,797,657 | 1/1989 | Vorzimmer et al. | 340/541 |
| 4,818,998 | 4/1989 | Apsell et al. | 342/44 |
| 4,837,568 | 6/1989 | Snaper | 340/825.540 |
| 4,888,575 | 12/1989 | De Vaulx | 349/426 |
| 4,931,664 | 6/1990 | Knoll | 307/10.3 |
| 4,947,151 | 8/1990 | Rosenberger | 340/426 |
| 4,949,268 | 8/1990 | Nishikawa et al. | 364/449 |
| 5,014,206 | 5/1991 | Scribner et al. | 364/449 |
| 5,027,383 | 6/1991 | Sheffer | 379/39 |
| 5,051,741 | 9/1991 | Wesby | 340/825.49 |

Primary Examiner—John B. Sotomayor
Attorney, Agent, or Firm—Fish & Richardson

[57] ABSTRACT

A theft detection and location system for aircraft utilizing both a conventional aircraft transponder/encoder and a dedicated transponder/encoder. The dedicated transponder is fixed on an alarm code which when transmitted in response to interrogation signals from ground stations, alerts air traffic controllers that the aircraft has been stolen. The system includes electronic switching devices which automatically enable the dedicated transponder to be activated each time an aircraft electrical master switch is turned on. An arming device is provided for activating the dedicated transponder in response to a predetermined condition. The dedicated transponder will continue to function even if the entire aircraft electrical system is turned off since the electronic switching device directly couples the dedicated transponder to the aircraft battery. A disarming device is provided in order to deactivate the dedicated transponder and in turn activate the conventional transponder.

33 Claims, 2 Drawing Sheets

AIRCRAFT THEFT DETECTION AND LOCATION SYSTEM

BACKGROUND OF THE INVENTION

The aviation industry in the U.S., Canada, Europe and other parts of the world currently utilize an aircraft location system known as the Air Traffic Control Radar Beacon System (ATCRBS). The system consists of an aircraft installed electronic device known as a transponder. The transponder is interrogated from the ground by a dedicated ATCRBS transmitter which is typically associated with a radar system of a ground station or airport. Upon receipt of a valid interrogation signal from the transmitter, the transponder on the aircraft sends back a reply. This operation occurs at a fairly rapid rate so that the information in the reply is instantaneous and continuous. A rotating antenna is used at the ground station so as to be able to determine the azimuth of the reply received from the aircraft transponder, and therefore accurately determine the direction of the aircraft relative to the ground station. By measuring the time between interrogation and reply, the speed of electricity being a known quantity, the ground station can also accurately determine the distance of the aircraft. In addition, the aircraft transponder is connected to a barometric device known as an encoding altimeter. This device automatically (when energized by the pilot) transmits, along with the transponder reply, the altitude of the aircraft.

All of the foregoing information is displayed on a conventional radar screen where an air traffic controller may see the bearing (azimuth), distance and altitude of the aircraft at all times. The need for this system became apparent because of the disparity of radar system target displays, whose d!definition is directly related to the size of the aircraft and the material from which it is manufactured. Larger aircraft will usually provide stronger radar displays than smaller aircraft, which in some cases may hardly be seen at all on the radar system. Fabric and synthetically constructed aircraft also do not provide good radar returns. With transponders in use, all radar displays are equalized, thus allowing for positive management of the aircraft by the air traffic controllers.

The transponder reply from the aircraft has an additional feature of being specifically coded for individual aircraft identification. There are presently 4096 of these codes now in use with the ATCRBS. A specific code is uniquely assigned to each aircraft at the beginning of each flight, and is retained until that flight reaches its destination, thus enabling the orderly transition of the aircraft from one controller and radar system to another as the aircraft continues along its route. There are several specific code designations which are reserved for special usage. The Code 1200 is used by aircraft not under positive control, flying under VFR conditions. This enables the aircraft to be seen by traffic controllers who are required to observe all aircraft within their range to maintain aircraft&. separation required for safe flight. The Code 0000 is used by the U.S. military and is never used by non-military aircraft. The Code 7700 is designated to advise air traffic controllers when an emergency exists (no other method of communication being available). The Code 7600 is used to designate a radio communication failure with all other aspects of the flight being normal. The Code 7500 is used to advise the air traffic controller (without needing to resort to voice communication) that the aircraft is being hijacked.

In recent years the theft of general aviation aircraft has risen dramatically. Surreptitious use of aircraft for smuggling drugs appears to be the leading cause of aircraft theft today. Unfortunately, it is not very difficult to steal an airplane. Many aircraft are parked in unattended unsecured areas which are literally deserted at night. Forced entry to an aircraft is relatively easy. Once inside the cabin, an experienced pilot can start most aircraft without too much difficulty as many cabin class aircraft do not even have ignition key locks. The thief has two choices when he steals an aircraft. The aircraft may either be flown in a clandestine manner without communicating with air traffic controllers and hope that the flight and subsequent landing will go undetected. The other choice is to fly the aircraft in a normal manner communicating with all the many facilities required to utilize the system, and thereby try not to arouse any suspicion.

SUMMARY OF THE INVENTION

The present invention is a theft detection and location system including both a conventional aircraft transponder/encoder and a separately installed dedicated transponder/encoder. The dedicated transponder is connected to the system through an activation device, which includes a switching device, an activating switch for activating the dedicated transponder, and a disarming device for disarming same. The switching device, upon initial turn-on of an aircraft master switch, operates to disconnect the conventional transponder from a power source, thus rendering it inoperative and, at the same time, provides power to the dedicated transponder which is permanently set on a specific alarm code assigned by the FAA.

A valid pilot of the aircraft may disarm the system by utilizing the disarming device, e.g. entering a code into a keyboard. Thereafter, the switching device immediately reconnects the power source back to the conventional transponder. The only way to disarm the dedicated transponder is through the usage of the disarming device. Turning the master switch off would have no affect since the dedicated transponder at that point is connected directly to the power source, e.g. the aircraft battery or a separate dedicated batter.

The use of the activating switch, such as an oil pressure switch, a landing gear squat switch, or a switch actuated by air pressure produced by the forward motion of the aircraft, ensures that the dedicated transponder is activated only in response to a predetermined condition of the aircraft, e.g. the engines being started or the aircraft actually in flight.

Once it is activated, the dedicated transponder continuously transmits the specific alarm code in response to interrogation signals from ground stations. The reception of the alarm code by the ground station alerts air traffic controllers to the unauthorized use of the aircraft. In turn, the controllers may alert the appropriate authorities while monitoring the flight progress of the aircraft and conversing with the unauthorized user, who would have no knowledge of the surveillance to which the aircraft is subjected, in a conventional manner.

The benefits of immediate and continuous detection of stolen aircraft to enable quick recovery and apprehension of the aircraft and thief, to the aircraft owner, to the owner's insurance company, to the drug enforcement agency, to the safety of our aviation system, and to the general public are immediately apparent.

DETAILED DESCRIPTION OF THE ILLUSTRATED EMBODIMENTS

Figure 1:
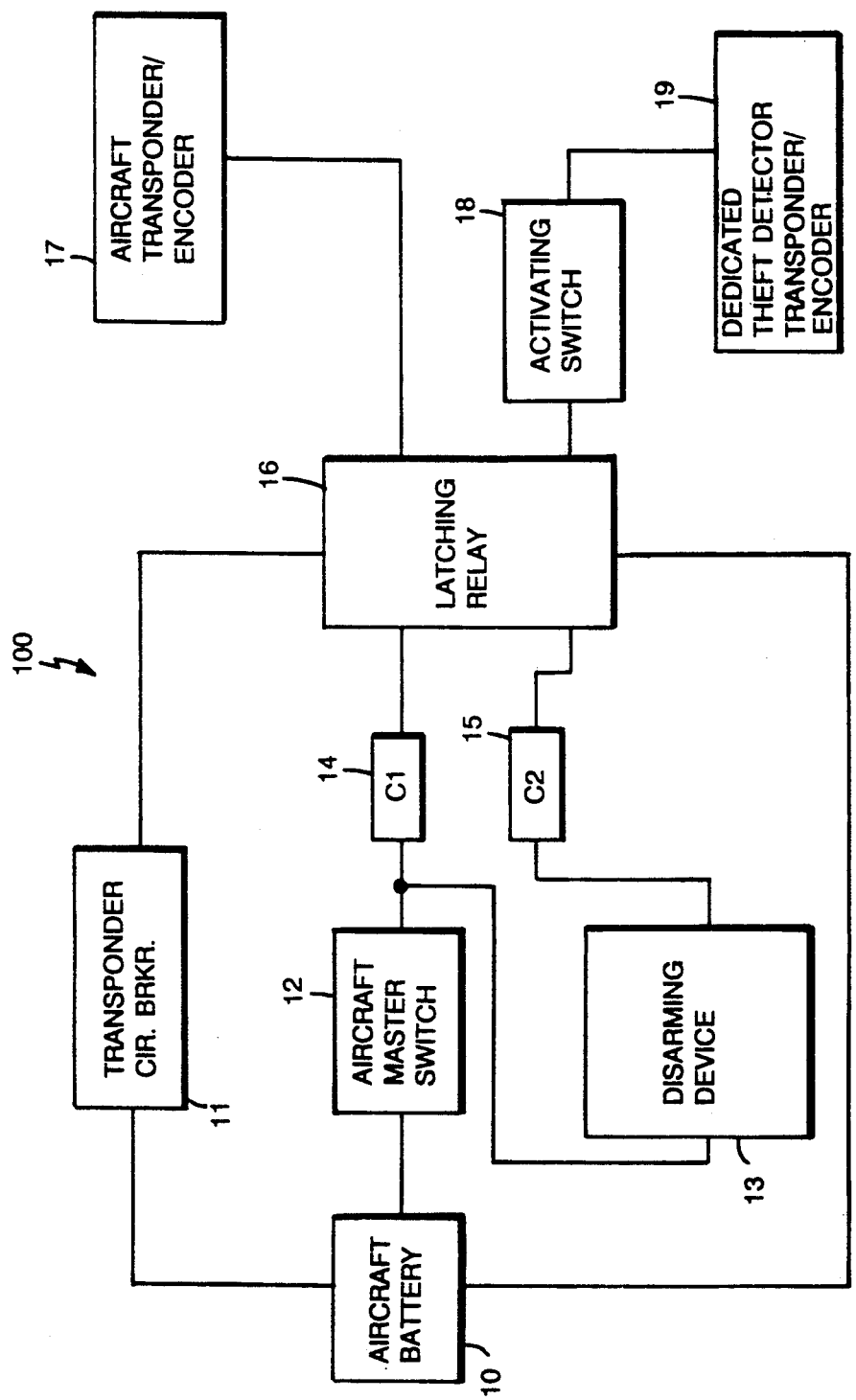
FIG. 1 shows a schematic block diagram of the theft detection and location system according to the present invention.

With reference to FIG. 1, the Eagle Eye TM aircraft theft detection and location system 100 according to the present invention is illustrated. The system 100, which is mounted in an aircraft (not shown), includes a conventional aircraft battery 10 and an aircraft master switch 12. The battery 10 may be, for example, a 28 volt DC battery. The master switch 12 is coupled to a latching relay 16 through a capacitor 14. The latching relay 16 provides an electrical path to a conventional aircraft transponder/encoder 17 which operates in the manner described above. A transponder circuit breaker 11 is provided in series between the battery 10 and the latching relay 16.

The system 100, according to the present invention, also includes a dedicated transponder/encoder 19 which is utilized for theft detection and location functions described herein. The transponder 19 is coupled to the latching relay 16, and therefore the battery 10, through an activating switch 18 A disarming device 13 and a capacitor 15 are coupled in series between the master switch 12 and the latching relay 16.

The latching relay 16 may be a four pole double throw latching relay which contains two separate sets of single pole, double throw contacts and respective first and second coils (not shown). The set of contacts associated with the first coil is wired so that the power from the battery 10 via the circuit breaker 11 is connected to the conventional transponder 17 when the latching relay 16 is in the latch off mode. This latching action allows for the normal operation of the transponder 17 when the latching relay 16 is in the latch-off mode. When the master switch 12 is turned on, 28 volts DC voltage from battery 10 is provided to various voltage busses throughout the aircraft's electrical system. Once energized, 28 volts are fed through the capacitor 14, for example a 30 microfarad/50 volt electrolytic capacitor, to the latching relay 16 where the power is used to energize and latch on the first coil of the relay. This latching action causes the first set of contacts feeding the transponder 17 to open, rendering the transponder 17 inoperative.

The second set of contacts in the latching relay 16 is wired to provide power in the form of the battery voltage directly from the battery 10 and through the activating switch 18 to the dedicated transponder 19. The activating switch may be actuated by any one or combination of several devices, for example an oil pressure switch which turns on when an engine is started, a wind actuated switch which turns on when the aircraft is airborne, or a landing gear squat switch which is actuated when the weight of the aircraft comes off of the landing gear. In response to the actuation of the activating switch 18, the power from the battery 10 is then provided directly to dedicated transponder 19. In this manner, the transponder 19 will not be activated until the aircraft is in operation.

The transponder 19, the activating switch 18, and the latching relay 16 are preferably located in an inaccessible section of the aircraft apart from the conventional components associated with the transponder 17. The transponder 19 is permanently in an "on" position with the code selector of the transponder set on a unique theft alarm code designated by the FAA. The operation of the latching relay 16 described above is activated when the master switch 12 is turned on. This action disables the conventional transponder 17 and provides power to operate the dedicated transponder 19 when the activating switch 18 is actuated. The sequence started by turning on the master switch 12 effectively deactivates the conventional transponder 17 and at the same time activates the dedicated transponder 19, thus arming the system 100. Once the mechanical latching of the latching relay 16 is actuated, the switching off of the master switch 12 will not disengage the armed condition. The system 100 functions until it is disarmed, since the battery voltage is provided directly from the battery 10 through the latching relay 16, and not through any of the conventional aircraft switching devices.

The disarming device 13 is preferably located in the cabin of the aircraft in either a hidden from view or clearly in view position. The disarming device 13 may be, for example, a ten key digital keyboard (not shown). The disarming device 13 may include annunciators (not shown) such as red and green LEDs which indicate an armed or unarmed condition, respectively. A valid user of the aircraft may disarm the system 100 by entering a private code into the keyboard. The private code may be, for example, a four digit code which when entered disarms the dedicated transponder 19. In response to entering the four digit into the keyboard, an electrical pulse is provided through the capacitor 15, which in turn is applied to the second coil of the latching relay 16, thus latching the relay in the latch-off condition. This sequence restores power to the conventional transponder 17 and deactivates the dedicated transponder 19. If the above described disarming sequence is not followed, as would be the case if the aircraft is stolen, the dedicated transponder 19 continues to automatically transmit replies to all interrogations from ATCRBS systems within range of the aircraft without the knowledge of the unauthorized user of the aircraft.

Following an authorized flight, in which the system 100 has been disarmed, no further action is required of the system since the latching relay 16 mechanically remains in the latch-off condition. The system 100 automatically rearms itself the next time the master switch 12 is turned on.

It will be appreciated by those of ordinary skill in the art that various modifications of the above described embodiment fall within the scope of the present invention. For example, the disarming device 13 may be any number of conventional security devices including a magnetic card reader, a key-lock switch, or a radio controlled disarming device. Furthermore, the latching relay 16 may be replaced with various conventional switching devices including microprocessor controlled switches.

The transponders 17, 19 utilized in the system 100 are state-of-the-art devices which meet all the specifications required by the FAA for the category of aircraft in which they will be installed. If desired, the system 100, which in the above description is powered directly from the aircraft battery 10, may be powered by a separate dedicated battery that is continuously charged by an alternator system of the aircraft.

Figure 2:
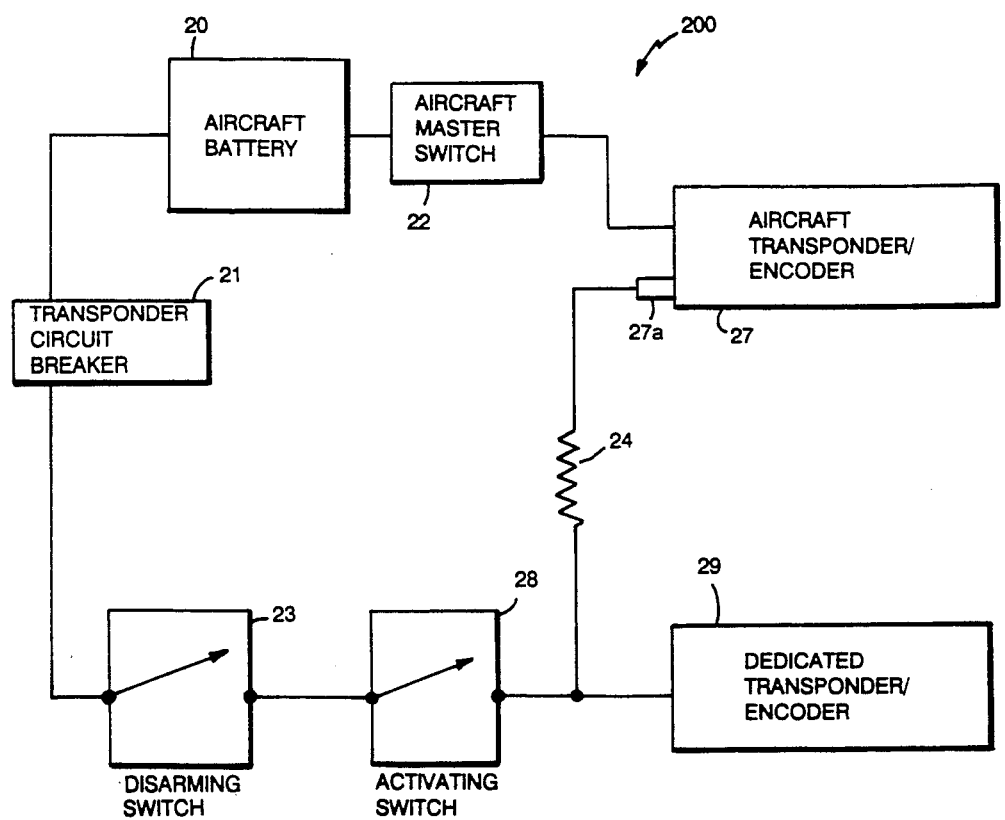
FIG. 2 shows a schematic block diagram of another embodiment of the theft detection and location system according to the present invention.

With reference now to FIG. 2, another embodiment of the Eagle Eye TM aircraft theft detection and location system 200 according to the present invention is illustrated. The system 200 is a more simplistic configuration than that illustrated in FIG. 1. The system 200 includes an aircraft battery 20 (28 volts DC) directly connected to a transponder circuit breaker 21 for supplying power to a disarming switch 23. The disarming switch may be, for example, a key operated switch or a toggle switch which is hidden in the cabin of the aircraft. The disarming switch 23 is in turn connected to an activating switch 28, which may be any of the switches described above with reference to activating switch 18 of FIG. 1.

The activating switch 18 enables a dedicated transponder/encoder 29, which operates identically to the transponder 19 of system 100. The system 200 has a conventional aircraft transponder/encoder 27 which is coupled to the battery 20 for activation through an aircraft master switch 22. The transponder 27 has a suppression input 27a that is coupled via a resistor 24 to the activating switch 28 in order to receive the battery voltage being applied to the transponder 29.

In operation, the disarming switch 23 is set to allow the batter voltage to be applied to the activating switch 28. Once the activating switch 28 is triggered, the dedicated transponder 29 receives the power from the battery 20 and is activated to transmit the alarm code in response to interrogations from ground stations. At the same time, the battery voltage supplied from the disarming switch 23 is reduced and limited by the resistor 24 as it is also applied to the suppression input 27a of the transponder 27. The voltage thus applied to the suppression input disables the transponder 27, leaving only the transponder 29 activated.

In response to the disarming switch 23 being turned to an off or disarmed position, the battery voltage is no longer applied to the dedicated transponder 29, and thus the suppression voltage is not applied to the suppression input 27a of the transponder 27. At this stage of operation, the dedicated transponder 29 is deactivated and the transponder 27 is allowed to operate in a conventional manner. It will be appreciated by those of ordinary skill in the art that a critical function of the theft detection and location system according to the present invention is to allow only one of the transponders to be activated at any time.

We claim:

1. A theft detection and location system for an aircraft, wherein said aircraft includes a first transponder operable for transmitting when activated identification and location information which comprises variably set identification data in response to receiving an interrogation signal from an interrogation source, said system comprising:
a second transponder operable for transmitting when activated identification and location information which comprises fixed alarm data in response to receiving an interrogation signal from an interrogation source; and
a switching device operable for switching said system between an armed state and a disarmed state, said armed state corresponding to said second transponder being activated and said first transponder being deactivated, and said disarmed state corresponding to said first transponder being activated and said second transponder being deactivated.

2. The system of claim 1, wherein said switching device is initially set to connect a power source to said second transponder, and wherein said switching device further comprises an activation means coupled to said second transponder for activating said second transponder.

3. The system of claim 1, wherein said interrogation source is an Air Traffic Control Radar Beacon System.

4. The system of claim 2, wherein said switching device includes a latching relay.

5. The system of claim 2, wherein said switching means is a microprocessor controlled switch.

6. The system of claim 2, wherein said activation means includes an oil pressure switch which is actuated in response to the start of an engine associated with said aircraft.

7. The system of claim 2, wherein said activation means includes a wind actuated switch which is actuated in response to said aircraft becoming airborne.

8. The system of claim 2, wherein said activation means includes a landing gear squat switch which is actuated in response to the eight of said aircraft being removed from landing gear associated with said aircraft.

9. The system of claim 1, wherein said switching device is initially set to connect a power source to said second transponder, said switching device further comprises a disarming means for causing said switching device to switch said power connection from said second transponder to said first transponder in response to said disarming means being actuated.

10. The system of claim 1, wherein said interrogation source is an Air Traffic Control Radar Beacon System.

11. The system of claim 9, wherein said disarming means includes a keyboard which is actuated in response to a code being entered by a user.

12. The system of claim 9, wherein said disarming means includes a magnetic card reader.

13. The system of claim 9, wherein said disarming means includes a key operated switch.

14. The system of claim 9, wherein said disarming means includes a toggle switch.

15. The system of claim 9, wherein said disarming means includes a radio controlled deactivating device.

16. The system of claim 1, wherein said switching device comprises:
an activation means coupled between said power source and said second transponder for activating said second transponder in response to said activation means being actuated; and
a disarming means for de-energizing said second transponder in response to said disarming means being actuated;
said system in said armed state in response to said activation means being actuated and said disarming means not being actuated;
said system in said disarmed state in response to either said activation means not being actuated or said disarming means being activated.

17. The system of claim 1, wherein said switching device comprises:
a latching device operable for latching a voltage from a voltage source to one of said first and second transponders, said latching device initially latching said voltage to said second transponder in response to said system being turned on;

an arming device which when actuated switches said system to said armed state by causing said latching device to latch said voltage to said second transponder; and a disarming device which when actuated switches said system to said disarmed state by causing said latching device to latch said voltage to said first transponder.

18. The system of claim 1, wherein said switching device comprises:

a first switch operable between actuated and deactuated positions; and a second switch operable between actuated and deactuated positions;

said system being switched to said armed state only in response to both said first switch and said second switch being in said respective actuated positions, and said system being switched to said disarmed state in response to either said first switch: or said second switch being in said respective deactuated positions.

19. The system of claim 1, wherein said interrogation source is an Air Traffic Control Radar Beacon System.

20. The system of claim 1, wherein said variably set identification data and said fixed alarm data are unique four digit codes.

21. The system of claim 1, wherein said identification and location information comprises information relating to altitude, bearing, and distance of said aircraft with respect to said interrogation source.

22. The system of claim 1 further comprising:

a power source; and a master switch for coupling said power source to said switching device;

wherein actuating said master switch causes said switching device to be switched to couple said power source to said second transponder, said power source being separately connected to said second transponder, so that said power source is coupled to said second transponder if said master switch is deactuated.

23. A theft detection and location system for an aircraft comprising:

a first transponder;

a second transponder;

a power source;

an enabling switch coupled between said power source and said second transponder for enabling said second transponder in response to said enabling switch being actuated;

a first disabling switch coupled between said enabling switch and said first transponder for disabling said first transponder in response to said enabling switch being actuated; and a second disabling switch coupled between said power source and said enabling switch for disabling said second transponder and for activating said first transponder in response to said second disabling switch being actuated.

24. The system of claim 23, wherein said first transponder is operable for transmitting identification and location data in response to receiving an interrogation signal from an interrogation source, said identification and location data comprising variably set identification information set by a user of said system.

25. The system of claim 24, wherein said second transponder is operable for transmitting identification and location data in response to receiving an interrogation signal from an interrogation source, said identification and location data comprising fixed alarm information.

26. The system of claim 23, wherein said first disabling switch comprises a resistor coupled between said enabling switch and said second transponder so as to provide a suppression voltage to a disabling input of said first transponder.

27. A theft detection and location system for an aircraft, comprising:

a dedicated transponder operable for transmitting when activated identification and location information which comprises fixed alarm data in response to receiving an interrogation signal from an interrogation source;

a switching device operable for switching said system between an armed state and an disarmed state, said armed state corresponding to said dedicated transponder being activated, and said disarmed state corresponding to said dedicated transponder being deactivated.

28. The system of claim 27, wherein said switching device comprises:

a latching device operable for latching a voltage from a voltage source to said dedicated transponder, said latching device initially latching said voltage to said dedicated transponder in response to said system being turned on;

an arming device which when actuated switches said system to said armed state by causing said latching device to latch said voltage to said dedicated transponder; and a disarming device which when actuated switches said system to said disarmed state by causing said latching device to unlatch said voltage to said dedicated transponder.

29. The system of claim 27, wherein said switching device comprises:

a first switch operable between actuated and deactuated positions; and a second switch operable between actuated and deactuated positions;

said system being switched to said armed state only in response to both said first switch and said second switch being in said respective actuated positions, and said system being switched to said disarmed state in response to either said first switch or said second switch being in said respective deactuated positions.

30. The system of claim 27, wherein said interrogation source is an Air Traffic Control Radar Beacon System.

31. The system of claim 27, wherein said fixed alarm data is a unique four digit codes.

32. The system of claim 27, wherein said identification and location information comprises information relating to altitude, bearing, and distance of said aircraft with respect to said interrogation source.

33. A method for detecting and locating an aircraft, comprising the steps of:

transmitting an interrogation signal from a remote source;

receiving said interrogation signal at first and second transceiving devices associated with said aircraft;

transmitting, in response to receiving said interrogation signal, identification and location data from said first transceiving device when said system is in an alarm armed state and transmitting identification and location data from said second transceiving device when said system is in an alarm disarmed state; and receiving said identification and location data at said remote source; wherein said identification and location data transmitted from said first transceiving means comprises fixed alarm information, said identification and location information data transmitted from said second transceiving device comprises variably set identification information.

* * * * *